No. 808,625. PATENTED JAN. 2, 1906.
T. R. BEAUMONT.
CONSTRUCTION OF WHEELS.
APPLICATION FILED NOV. 29, 1904.

WITNESSES
INVENTOR
Thomas Richard Beaumont
by Bakewell Byrnes
his attys

UNITED STATES PATENT OFFICE.

THOMAS RICHARD BEAUMONT, OF PARK PLACE, LONDON, ENGLAND.

CONSTRUCTION OF WHEELS.

No. 808,625.     Specification of Letters Patent.     Patented Jan. 2, 1906.

Application filed November 29, 1904. Serial No. 234,775.

*To all whom it may concern:*

Be it known that I, THOMAS RICHARD BEAUMONT, a subject of the King of Great Britain and Ireland, residing at the Primrose Club, 5 Park Place, London, England, have invented certain new and useful Improvements in the Construction of Wheels, of which the following is a specification.

This invention relates to wheels for road or other vehicles in which segmental wooden fellies are connected with the hub by wooden spokes and are surmounted by metal tires; and it consists in devices by which the shrinkage to which the fellies and spokes are liable, more particularly in hot or dry climates, is counteracted or made good. For this purpose there is interposed between adjacent segments of the felly a wedge-shaped plug or expander which can be forced or drawn outward toward the tire as the felly-segments retract through shrinkage, and the felly-spokes are made extensible or telescopic, so that they may be altered to their requisite length simultaneously with the adjustment of the felly-expanders.

The invention will be more specifically described with reference to the accompanying drawings, in which—

Figure 1:
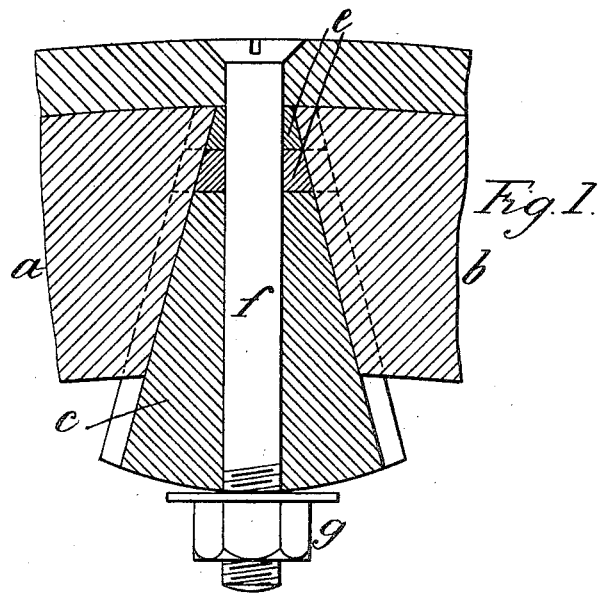
Figure 2:
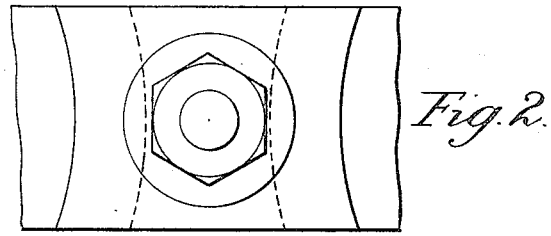

Figure 1 is a longitudinal section through part of the rim of a wheel, showing the felly-expander. Fig. 2 is a plan view of the inner side thereof; and Fig. 3 is a similar section through one of the felly-spokes, showing the means for maintaining the length of the latter.

The ends of two adjacent segments $a$ $b$ of the felly of a wheel are shaped to admit a wedge-shaped plug or expander $c$, which may be of wood or other suitable material and which extends part of the way into the space between the ends of the segments $a$ $b$, the remainder of the space between the plug $c$ and the tire $d$ being filled with liners $e$. A bolt $f$, countersunk in the tire, extends through the liners $e$ and plug $c$, the latter being secured thereon by means of a nut $g$. When the felly has shrunk to an extent which renders it necessary or desirable to take it up, one or more of such plugs $c$ is removed from its bolt and one or more of the outer liners $e$ removed. The plug is then replaced and wedged into the space between the felly-segments by screwing home the nut $f$. At the same time it may be necessary to lengthen the spokes, and for this purpose the outer end of each spoke $h$ is fitted with a loose but non-rotatable thimble or cap $i$, which is externally screw-threaded at $i'$, on which part are mounted a tightening-nut $k$ and a lock-nut $k'$. By screwing the nut $k$ against the inner surface of the felly-segment the cap or sleeve $i$ is pushed radially inward until it encounters the outer end of the spoke or the shoulder $h'$ of the latter. The nut is then locked in position, so as to maintain the spoke at its increased length.

Figure 3:
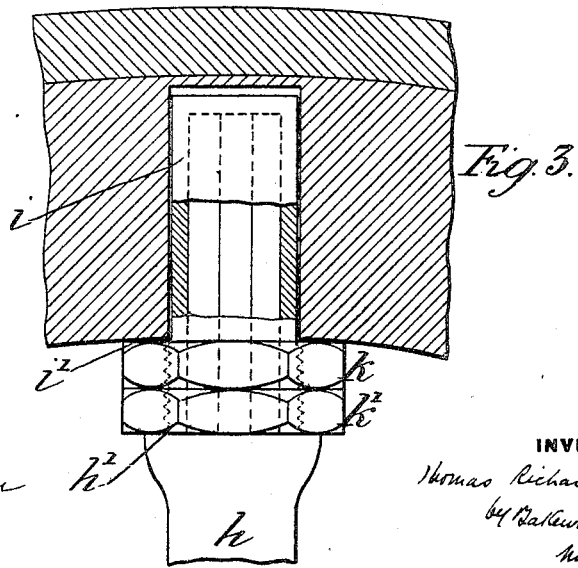

The cap $i$ may be as shown in Fig. 3 or it may consist only of the screw-threaded part $i'$, in which case the spoke end, which is shown as hexagonal to prevent rotation of the sleeve or cap, would be fitted into its socket in the felly in the usual manner.

Instead of using an expander such as shown in Figs. 1 and 2 the plug may be made in two halves, adapted to be forced apart by means of a right and left handed screw-bolt working in corresponding nuts fixed to the two halves of the plug.

Having thus described the nature of this invention and the best means I know of carrying the same into practical effect, I claim—

1. In a wheel in which a segmental wooden felly is surmounted by a metal tire, a wedge-shaped plug between adjacent segments of the felly, removable adjustment-liners between the outer end of the plug and the tire, a bolt countersunk in the tire and threading the said liners and plug, and a nut on said bolt engaging over said plug; substantially as described.

2. In a wheel such as herein described in which the spoke-tenons are let into the felly, a loose non-rotatable cap closely surrounding the tenon and closed over the end of the spoke, said cap extending inwardly beyond the inner periphery of the felly and being externally screw-threaded on its inner end for the reception of a tightening-nut adapted to engage the inner periphery of the felly and draw the crown of the cap against the end of the spoke; substantially as described.

In testimony whereof I have signed my name to this specification in the presence of two subscribing witnesses.

THOMAS RICHARD BEAUMONT.

Witnesses:
    C. S. HOPKINS,
    W. J. SKERTEN.